United States Patent [19]

Schaffner et al.

[11] Patent Number: 5,005,932
[45] Date of Patent: Apr. 9, 1991

[54] ELECTRO-OPTIC MODULATOR

[75] Inventors: James H. Schaffner, Chatsworth; William B. Bridges, Pasadena; Adrian E. Popa, Newbury Park, all of Calif.

[73] Assignee: Hughes Aircraft Company, Los Angeles, Calif.

[21] Appl. No.: 432,933

[22] Filed: Nov. 6, 1989

[51] Int. Cl.$^5$ ............................. G02B 6/10; G02B 5/14
[52] U.S. Cl. ................................ 350/96.14; 350/355; 350/392; 455/612; 372/12
[58] Field of Search ..................... 350/355, 356, 96.13, 350/96.14, 392; 372/12; 455/612

[56] References Cited

U.S. PATENT DOCUMENTS

| 4,208,091 | 6/1980 | Cheo et al. | 350/96.13 |
| 4,263,992 | 4/1981 | Beth et al. | 350/96.14 |
| 4,798,437 | 1/1989 | Rediker et al. | 350/355 |

FOREIGN PATENT DOCUMENTS

| 0006217 | 1/1981 | Japan | 350/356 |
| 0163217 | 10/1982 | Japan | 350/356 |

OTHER PUBLICATIONS

Holman et al; "A Very High ... Waveguide Modulator"; 1/80; IEEE, PP. TuE6/1-3, Conference; abst. only.
Podcameni, A.; "Symmetrical and ... Loss Design"; IEEE Trans. Microwave Theory & Tech., vol. MTT-34, #1, 1/86, pp. 1-7, abst. only supplied.
Alferness et al; "Velocity Matching ... Modulations", IEEE J. A. E., vol. QE20, #3, pp. 301-309, 3/84; abst. only.

*Primary Examiner*—Nelson Moskowitz
*Attorney, Agent, or Firm*—R. M. Heald; C. D. Brown; W. K. Denson-Low

[57] ABSTRACT

An electro-optic modulator (10) includes a pair of optical waveguide channels (20, 22) formed in an X-cut lithium niobate substrate (12) and an overlying RF coplanar waveguide (36). A periodic electrode structure (48) of the intermittent interaction type employs a plurality of middle stubs (52) to maintain the phase of the RF drive frequency in phase with the optical signal. The modulator (10) also utilizes shorter stubs (64) and tapered inlets (42) and outlets (44) to match and transform impedances.

18 Claims, 2 Drawing Sheets

ELECTRO-OPTIC MODULATOR

BACKGROUND OF THE INVENTION

1. Technical Field

The invention relates to the techniques for modulating optical signals, and more particularly to a planar interferometer electro-optic modulator.

2. Discussion

Fiber optic links are becoming increasingly important in a wide variety of applications such as millimeter wave communications and radar systems. An external electro-optic modulator is usually required for a millimeter wave fiber optic link since direct modulation of a solid state laser signal is generally not possible above microwave frequencies.

Travelling wave integrated optic modulators used for this purpose are known in the art. Typically, the modulators include an optical waveguide formed in a substrate and an overlying metallic electrode structure. The drive frequency applied to the electrode structure is used Examples of such modulators are found in Alferness et al., "Velocity-Matching Techniques for Integrated Optic Travelling Wave Switch/Modulators", IEEE J. Quantum Electronics, Vol. QE-20, No. 3, March 1984, pp. 301-309; Nazarathy et al., "Spread Spectrum Frequency Response of Coded Phase Reversal Travelling Wave Modulators", J. Lightwave Technology, Vol. LT-5, No. 10, October 1987, pp. 1433-1443; and Schmidt, "Integrated Optics Switches and Modulators", from *Integrated Optics: Physics and Applications*, S. Martellucci and A. N. Chester (eds.), pp. 181-210, Plenum Press, New York, 1981.

Travelling wave integrated optic modulators fabricated in substrate materials for which the optical and microwave drive velocities are equal offer the potential of very broad modulation bandwidth. However, for important electro-optic substrate materials such as lithium niobate there is an inherent mismatch between the optical and microwave velocities. Since the optical signal phase velocity in lithium niobate is nearly twice the microwave drive signal velocity, the magnitude of the phase modulation begins to degrade as the phase difference between the optical and microwave drive signals increases. This phenomena is often referred to as phase "walk off".

This velocity mismatch necessitates design trade-offs. The maximum achievable drive frequency decreases as the modulator length is increased. Conversely, to lower the drive voltage and power, a long device length is required. Thus, a trade off must be made between maximum drive frequency and required drive power. In other words, the modulator must be made shorter and the drive power larger as the frequency increases.

In prior attempts to compensate for this velocity mismatch, periodic electrode structures have been used in coplanar electro-optic modulators. These periodic electrode structures can be categorized into either periodic phase reverse electrodes or intermittent interaction electrodes. The known intermittent interaction electrode configurations are unbalanced transmission lines, i.e., they are asymmetric about the propagation axis. This leads to incompatibilities with the balanced line (typically coaxial or waveguide probe) transitions to the other fiber optic link transmitter components. The prior art modulators have been fabricated from Z-cut lithium niobate where the optical waveguide is placed under the metal electrode. In this construction, a dielectric buffer layer is usually required between the metallic electrode and the waveguide in the substrate. The dielectric layer is disadvantageous in that it introduces possible bias point instability. Further, the prior art modulators fail to disclose impedance matching circuitry which would ensure good efficiency and performance of the modulator.

SUMMARY OF THE INVENTION

In accordance with the teachings of the present invention, an electro-optic modulator is provided. The modulator includes a substrate having a major surface into which two generally parallel channels of an optical waveguide are formed. A radio frequency (RF) coplanar waveguide is formed on the major surface of the substrate. The RF coplanar waveguide has a pair of metallic ground conductors separated by a region that overlies the two optical waveguide channels. An optical signal having a given phase is input to the optical waveguide and electromagnetic energy is applied to the RF coplanar waveguide. Provision is made for adjusting the phase of the electromagnetic signal as it propagates down the RF coplanar waveguide from the drive source so as to maintain the electromagnetic signal in phase with the optical signal in the optical waveguide channels.

BRIEF DESCRIPTION OF THE DRAWINGS

The various advantages of the present invention will become apparent to one skilled in the art after reading the following specification and by studying the drawings in which.

DETAILED DESCRIPTION OF THE PREFERRED EMBODIMENT

Turning now to the drawings, the electro-optic modulator 10 is formed on a substrate 12 having a major surface 14. Preferably, substrate 12 is formed of X-cut lithium niobate (LiNbO$_3$). The term "X-cut" refers to a particular crystallographic orientation of the substrate material, which is determined by industry standards. The use of X-cut lithium niobate substrates are advantageous over the known use of Z-cut lithium niobate substrates. The use of Z-cut lithium niobate substrates generally requires that the RF electrodes be placed vertically above the optical waveguide. This, in turn, usually necessitates the use of a silicon dioxide (SiO$_2$) buffer layer to prevent optical loss. However, this buffer layer can be a source of bias instability. The use of X-cut lithium niobate alleviates these problems because it requires no buffer layer. The optical waveguide can be placed between the metallic electrodes of the RF coplanar waveguide as used in this invention.

Figure 3:
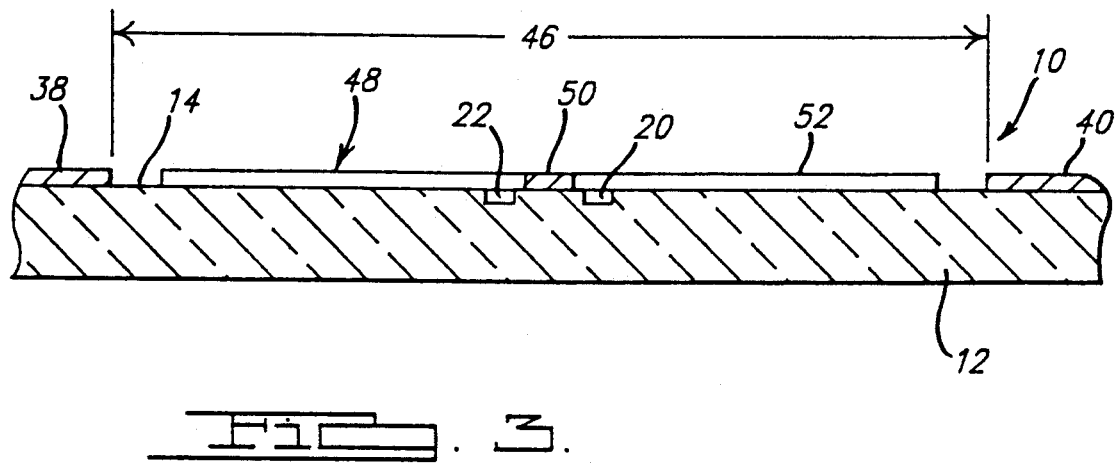
FIG. 3 is a partial cross-sectional view taken along the lines 3—3 of FIG. 2.

The optical waveguide 18 is patterned into a Mach-Zender interferometer. Optical waveguide 18 includes at least two generally parallel optical waveguide channels 20 and 22 which are formed in the substrate 12 immediately underneath major surface 14 as can be seen most clearly in FIG. 3. In this embodiment, the waveguide 18 includes an input 24 coupled to light source 26 such as a laser.

The waveguide 18 can be formed by diffusing titanium into the surface 14 of substrate 12 using well known techniques. The diffused titanium generally takes the form of a strip 25 which splits at junction 28 into the two channels 20 and 22. The channels 20 and 22 run parallel to each other throughout a substantial length of the substrate 12 and then are again joined together at junction 30 to form a line 32 terminating at optical output 34. The optical output 34 typically is coupled to an optical fiber, which serves as the transmission link to an optical receiver.

The electro-optic modulator 10 includes a symmetrical RF coplanar waveguide 36. The RF coplanar waveguide 36 generates an RF electric field in a region 46 between two metallic ground planes 38 and 40 on the major surface 14 of the substrate 10. Waveguide 36 has openings 42 and 44 on opposite sides of the substrate 12. In the preferred embodiment, opening 42 is an input opening coupled to an RF source 62. Opening 44 is an output opening coupled to an RF load 66.

Figure 1:
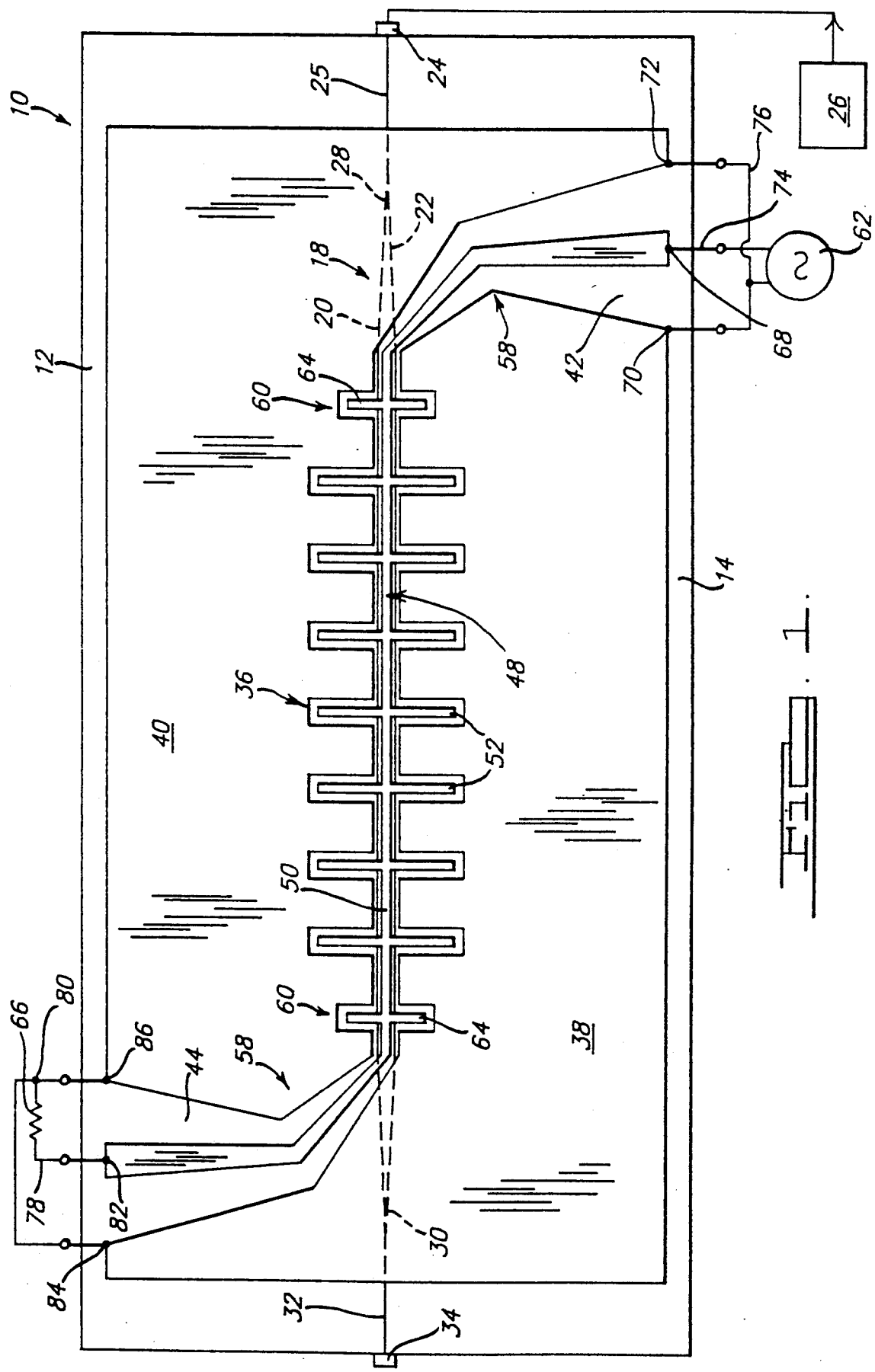
FIG. 1 is a top view of an electro-optic modulator made in accordance with the teachings of this invention.
Figure 2:
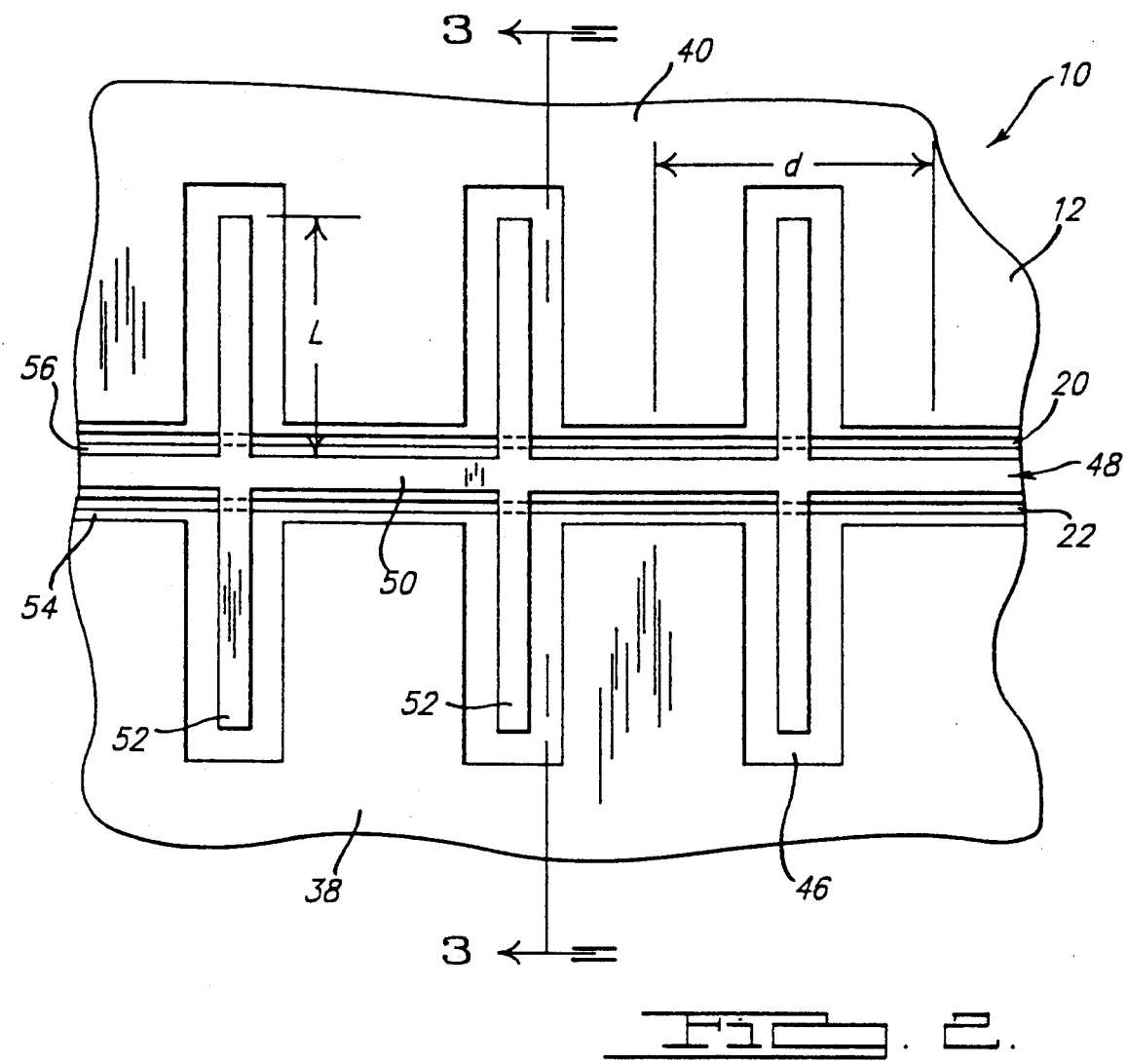
FIG. 2 is a partial enlarged top view of the modulator shown in FIG. 1.

Centrally located within the region 46 and upon the major surface 14 is a phase regulating conductor 48 of the intermittent interaction type. The major length of conductor 48 is in the form of a strip 50 having stubs 52 oriented transversely along both sides of the strip 50. Turning to FIG. 2, the length (L) of the stubs 52 and periodic distance (d) between the stubs 52 are determined by the following relationship:

$$f_D d(N_m - N_o) = -c\,(2L/\pi + n)$$

where L is the length of the stubs, d is the length of the periodic electrode section, $f_D$ is the RF design frequency, $\pi$ is the RF design wavelength, c is the free space speed of light, and n is an integer restricted to lie between:

$$-f_D d(N_m - N_o)/c < n < 0.$$

The edges of the RF coplanar ground plane conductors 38, 40 and the phase regulating conductor 48 define gaps 54 and 56, respectively.

Unlike prior electrodes of the intermittent interaction type, the phase regulating conductor 48 is symmetric about the axis of RF propagation. This symmetry causes the modulator to behave like a balanced transmission line, and facilitates testing and packaging of the modulator.

One of the features of the invention is the incorporation of impedance transforming circuitry 58 and impedance matching features 60 within the modulator 10. Having impedance transforming and impedance matching characteristics built into the modulator 10 facilitates connection of the RF source 62 since no extra impedance matching circuitry is required. Impedance transforming is performed by tapered input and output openings 42 and 44. The impedance matching is carried out by end stubs 64 which are shorter than the middle stubs 52. Together the impedance transforming openings 42, 44, 58 and the impedance matching stubs 64 transform the modulator's RF impedance to the impedance level of the source and the load. The impedance matching stubs 64 serve to transform the impedance of the periodic electrode structure to the impedance of an unperturbed linear RF coplanar waveguide. The impedance transforming sections 58 serve to bring the impedance level seen by the RF signal at a location just outside the impedance matching stub up to the impedance level of the source and the load.

The RF coplanar waveguide 36 and phase regulating conductor 48 can be formed by first depositing a layer of conducting material upon the major surface 14 of substrate 10. This may be accomplished by thermal deposition or sputtering of the desired metal onto the substrate in a vacuum chamber. In the preferred embodiment, gold is used with an underlying layer of chromium or titanium to facilitate adhesion to the major surface 14 of substrate 12. The metallic ground conducting layers 38, 40 and the phase regulating conductor 48 are up-plated in thickness using an electrolytic gold plating solution and the gaps 54 and 56 are etched by an iodine gold etchant and a buffered oxide etch (containing hydrofluoric acid).

The connection of the microwave source 62 and the load 66 to the modulator 10 is straightforward. In the preferred embodiment, a terminal 68 is connected to one line 74 from the source 62, while terminals 70 and 72 are connected to the other line 76 of source 62. One side 78 of load 66 is connected to terminal 82, while the other side 80 is connected to terminals 84 and 86.

The method for modulating an optical signal begins with passing an optical signal of a given phase from optical source 26 through optical input means 24 into the optical waveguide 18 of the modulator. The signal enters both channels 20 and 22. Next, the coplanar waveguide 36 is coupled to a modulating RF signal source 62. The electric field components in the gaps 54 and 56 are oriented generally perpendicular to the direction of RF signal propagation and are of opposite polarity. In the area of the optical waveguide channels 20 and 22, the electric field components pass through the channels and electro-optically change their waveguide indices and, therefore, the phase of the optical signals. Since the phase changes within the channels 20 and 22 are different, amplitude modulation occurs at the junction 30 when the optical signals in channels 20 and 22 combine.

Since the RF signal velocity is less than the optical signal velocity, the electro-optic modulator 10 incorporates the phase regulating conductor 48. The phase of the microwave signal in the coplanar waveguide 42 is periodically advanced by removing the signals in the gaps 56 and 54 from the area of channels 20 and 22 and passing them around stubs 52. When the signals return to the area of the channels 20 and 22, the microwave and optical signals are again in phase. This electrode structure makes possible the modulation of optical signals by RF signals above microwave frequencies. The RF source output power needed to achieve sufficient depth of modulation can be reduced by increasing the length of the modulator.

Although the invention has been described with particular reference to certain preferred embodiments thereof, variations and modifications can be effected within the spirit and scope of the following claims.

What is claimed is:

1. An electro-optic modulator comprising:
   (a) a substrate having a major surface;
   (b) an optical waveguide having at least two generally parallel optical waveguide channels formed in said substrate adjacent said major surface;
   (c) an RF coplanar waveguide formed on the major surface of the substrate, said RF coplanar waveguide having first and second metallic ground conductors thereon which are separated by a region, the region overlying the two optical waveguide channels, said RF coplanar waveguide also having an axis of RF signal propagation within the region;

(d) optical input means for coupling an optical signal of a given phase to the optical waveguide;

(e) electromagnetic drive source means for coupling electromagnetic energy to the RF coplanar waveguide; and (f) phase regulating conductor means in said region between the first and second metallic ground conductors for adjusting the phase of the electromagnetic energy to maintain it in phase with the optical signal in the optical waveguide; said regulating conductor means being symmetric about the axis of RF signal propagation.

2. The electro-optic modulator of claim 1 wherein said substrate is made of X-cut lithium niobate (LiNbO$_3$).

3. The electro-optic modulator of claim 1 wherein said electromagnetic drive source means comprises:

(a) a first input terminal coupled to said first metallic ground conductor;

(b) a second input terminal coupled to said second metallic ground conductor;

(c) a third input terminal coupled to said phase regulating conductor means; said first and second input terminals being coupled to a first output terminal of an RF source and said third input terminal being coupled to a second output terminal of an RF source; said first, second, and third input terminals being adjacent to a first opening of said RF coplanar waveguide.

4. The electro-optic modulator of claim 3 wherein said electromagnetic drive source means further comprises:

(a) a first output terminal coupled to said first metallic ground conductor;

(b) a second output terminal coupled to said second metallic ground conductor;

(c) a third output terminal coupled to said phase regulating conductor means, said first and second output terminals being coupled to a first output terminal of an RF load and said third output terminal being coupled to a second input terminal of an RF load; said first, second, and third output terminals being adjacent to a second opening of said RF coplanar waveguide.

5. The electro-optic modulator of claim 1 wherein said phase regulating conductor means comprises a metallic electrode having an elongated strip lying on the major surface of the substrate, within the region and between the optical waveguide channels, said electrode further including a plurality of transversely extending stubs placed at periodic intervals.

6. The electro-optic modulator of claim wherein said optical waveguide comprises at least one channel on the substrate diffused with titanium.

7. The electro-optic modulator of claim 1 wherein said RF coplanar waveguide further includes input impedance transforming means, oriented transversely along and on a first side of said major surface, for bringing the input impedance level of the RF coplanar waveguide to the output impedance level of an RF source.

8. The electro-optic modulator of claim 7 wherein said input impedance transforming means comprises a first tapered opening of said RF coplanar waveguide.

9. The electro-optic modulator of claim 1 wherein said RF coplanar waveguide further includes output impedance transforming means, oriented transversely along and on a second side of said major surface, for bringing the output impedance level of the RF coplanar waveguide to the input impedance level of an RF load.

10. The electro-optic modulator of claim 9 wherein said output impedance transforming means comprises a second tapered opening of said RF coplanar waveguide.

11. The electro-optic modulator of claims 5, 7, or 9 wherein the phase regulating conductor means further includes impedance matching means for matching the input impedance of the phase regulating means to the output impedance of the input impedance transforming means, and for matching the output impedance of the phase regulating conductor means to the input impedance of the output impedance transforming means.

12. The electro-optic modulator of claim 11 wherein said impedance matching means comprises first and last stubs that are shorter than the middle stubs in the phase regulating conductor.

13. An electro-optic modulator comprising:

(a) an X-cut lithium niobate substrate having a major surface;

(b) an optical waveguide having at least two generally parallel optical waveguide channels formed in said substrate adjacent said major surface, at least one channel in the substrate being diffused with titanium;

(c) an RF coplanar waveguide formed on the major surface of the substrate, said RF coplanar waveguide having first and second metallic ground conductors thereon which are separated by a region, the region overlying the two optical waveguide channels, said RF coplanar waveguide further including input and output impedance transforming means, oriented transversely along the major surface and at opposite openings of said RF coplanar waveguide for bringing the input impedance level of the RF coplanar waveguide to the output impedance level of an RF source, and for bringing the output impedance level of the RF coplanar waveguide to the input impedance level of an RF load, said impedance transforming means including tapered first and second RF coplanar waveguide openings;

(d) optical input means for coupling an optical signal of a given phase to the optical waveguide;

(e) electromagnetic drive source means, for coupling electromagnetic energy to the RF coplanar waveguide, said electromagnetic drive source means comprising a first input terminal coupled to said first metallic ground conductor, a second input terminal coupled to said second metallic ground conductor, and a third input terminal coupled to said phase regulating conductor means, said first and second input terminals being coupled to a first output terminal of an RF source and said third input terminal being coupled to a second output terminal of an RF source, said first, second, and third input terminals being adjacent to said first RF coplanar waveguide opening, said electromagnetic drive source means further including a first output terminal coupled to said first metallic ground conductor, a second output terminal coupled to said second metallic ground conductor, and a third output terminal coupled to said phase regulating conductor means, said first and second output terminals being coupled to a first input terminal of an RF load and said third output terminal being coupled to a second input terminal of an RF load, said first, second, and third output terminals being adjacent to said second coplanar waveguide opening; and (f) phase regulating conductor means in said region between the first and second metallic ground conductors for adjusting the phase of the electromagnetic energy to maintain it in phase with the optical signal in the optical waveguide, said phase regulating conductor means including a metallic electrode having an elongated strip lying on the major surface of the substrate, within the region and between the optical waveguide channels, said electrode further including a plurality of transversely extending stubs placed at periodic intervals, first and last of said stubs being shorter than the middle stubs, and said electrode being symmetric about the axis of RF signal propagation.

14. A method for modulating a light signal comprising the steps of:

(a) passing an optical signal of a given phase through an optical waveguide having at least two generally parallel optical waveguide channels formed in an x-cut lithium niobate substrate and adjacent a major surface of said substrate; and (b) coupling electromagnetic energy from an RF source to an RF coplanar waveguide, such that the interaction of the electromagnetic energy and the optical waveguide channels produces a change in phase in the optical signal, said RF coplanar waveguide being formed on the major surface of the substrate, said RF coplanar waveguide having first and second metallic ground conductors thereon which are separated by a region, the region overlying the two optical waveguide channels, said electromagnetic energy being maintained in phase with the optical signal through the use of a phase regulating conductor means in said region between the first and second metallic ground conductors, said phase regulating conductor means including a metallic electrode having an elongated section lying on the major surface of the substrate, within the region and between the optical waveguide channels, said electrode further including a plurality of transversely extending stubs placed at periodic intervals.

15. The method of claim 14 which further comprises forming at least one channel of the optical waveguide by diffusive titanium into the substrate.

16. The method of claim 14 further including transforming the output impedance of the RF source to the input impedance of the RF coplanar waveguide, and transforming the output impedance of the RF coplanar waveguide to the input impedance of a load, through the use of input and output impedance transforming means comprising tapered input and output RF coplanar waveguide openings.

17. The method of claim 16 further including matching the input impedance of the phase regulating conductor means to the output impedance of the input impedance transforming means, and matching the output impedance of the phase regulating conductor means to the input impedance of the output impedance transforming means, through the use of first and last stubs shorter than stubs in the middle of said metallic electrode.

18. The method of claim 14 wherein electromagnetic energy is coupled to the RF coplanar waveguide using an electromagnetic drive source means comprising:

first input terminal coupled to said first metallic ground conductor, a second input terminal coupled to said second metallic ground conductor, and a third input terminal coupled to said phase regulating conductor means, said first and second input terminals being coupled to a first output terminal of an RF source and said third input terminal being coupled to a second output terminal of an RF source, said first, second, and third input terminals being adjacent to said first RF coplanar waveguide opening, said electromagnetic drive source means further including a first output terminal coupled to said first metallic ground conductor, a second output terminal coupled to said second metallic ground conductor, and a third output terminal coupled to said phase regulating conductor means, said first and second output terminals being coupled to a first input terminal of an RF load and said third output terminal being coupled to a second input terminal of an RF load, said first, second, and third output terminals being adjacent to said second coplanar waveguide opening.

* * * * *